(12) United States Patent
Guicheteau

(10) Patent No.: US 6,659,541 B1
(45) Date of Patent: Dec. 9, 2003

(54) SUN ROOF COVER FOR A ROOF OPENING IN A MOTOR VEHICLE ROOF

(75) Inventor: Jean-Luc Guicheteau, Cholet (FR)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/048,599
(22) PCT Filed: Jul. 28, 2000
(86) PCT No.: PCT/EP00/07362
§ 371 (c)(1),
(2), (4) Date: Jul. 9, 2002
(87) PCT Pub. No.: WO01/08914
PCT Pub. Date: Feb. 8, 2001

(30) Foreign Application Priority Data

Aug. 2, 1999 (FR) .............................. 99 10036

(51) Int. Cl.[7] ................................ B60J 7/043
(52) U.S. Cl. ................... 296/216.02; 296/223
(58) Field of Search ............ 296/216.02, 216.03, 296/223

(56) References Cited

U.S. PATENT DOCUMENTS 4,995,665 A * 2/1991 Ichinose et al. ............ 296/213
5,275,461 A 1/1994 Cheron et al.

FOREIGN PATENT DOCUMENTS

| DE | 12 80 710 B | 10/1968 | | |
|----|----|----|----|----|
| FR | 2 679 174 A | 1/1993 | | |
| JP | 205514 | * | 9/1986 | ................. 296/223 |
| JP | 361211127 | * | 9/1986 | ............ 296/216.03 |

* cited by examiner

*Primary Examiner*—Dennis H. Pedder
(74) *Attorney, Agent, or Firm*—Nixon Peabody LLP; David S. Safran

(57) ABSTRACT

A sliding roof cover for the roof opening of a motor vehicle roof which is supported to be moved along and be raised on guide rails which run lengthwise on either side of the roof opening. The sliding cover including a bearing on each guide rail having a front and a rear swiveling guide arrangement for raising or lowering the front edge and/or rear edge section of the cover when opening or closing the cover, and the two swiveling arrangements being coupled to one another. Each swiveling guide arrangement has a swiveling arm coupled to the cover and two guide elements which are spaced apart from one another and are movably supported on a guideway located on the roof-mounted guide rail. The two guide elements of each swiveling arm are guided in a deflection section of the guideway such that they swivel the swiveling arms for lifting or lowering the front or rear section of the cover.

14 Claims, 3 Drawing Sheets

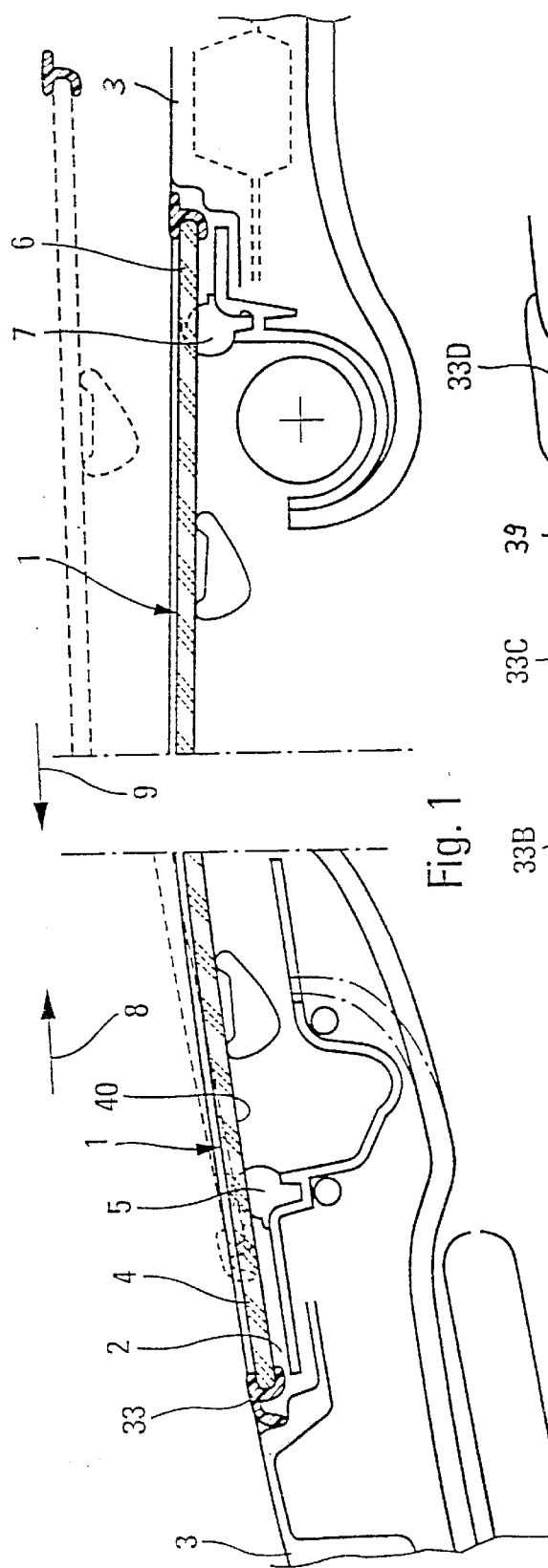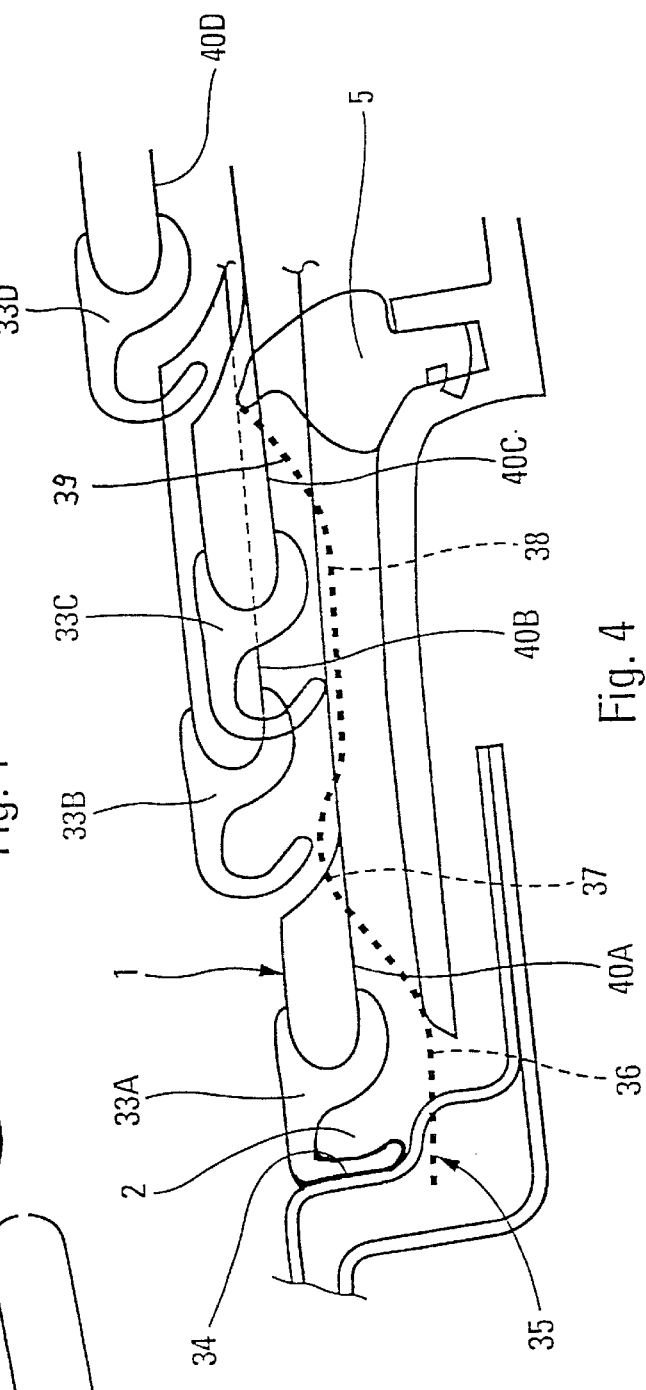
Fig. 1
Fig. 4

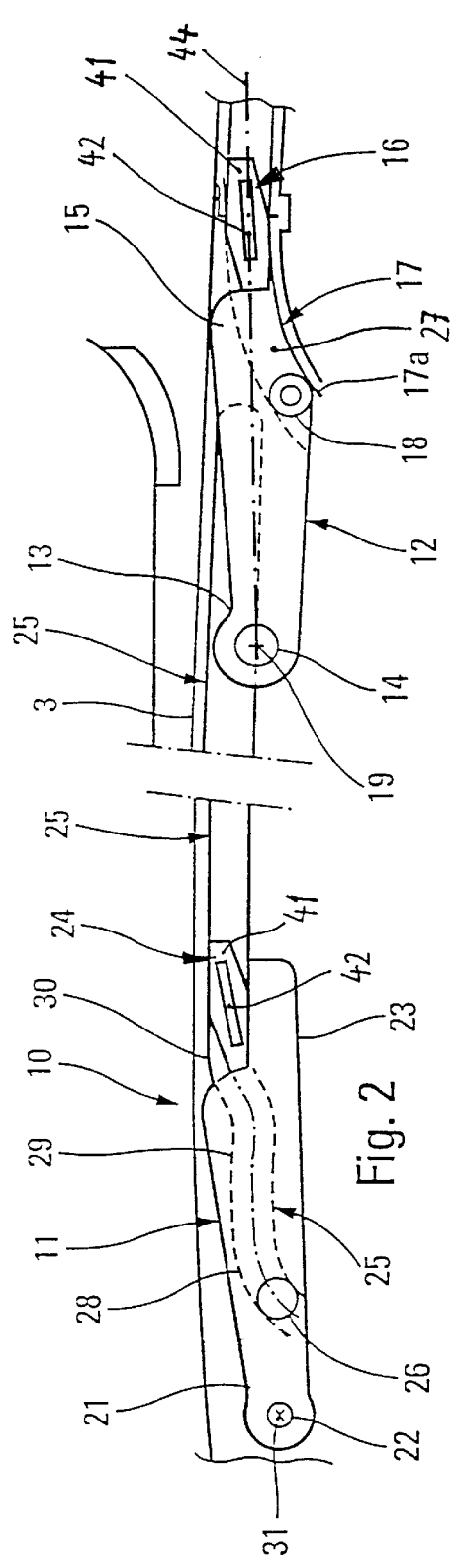
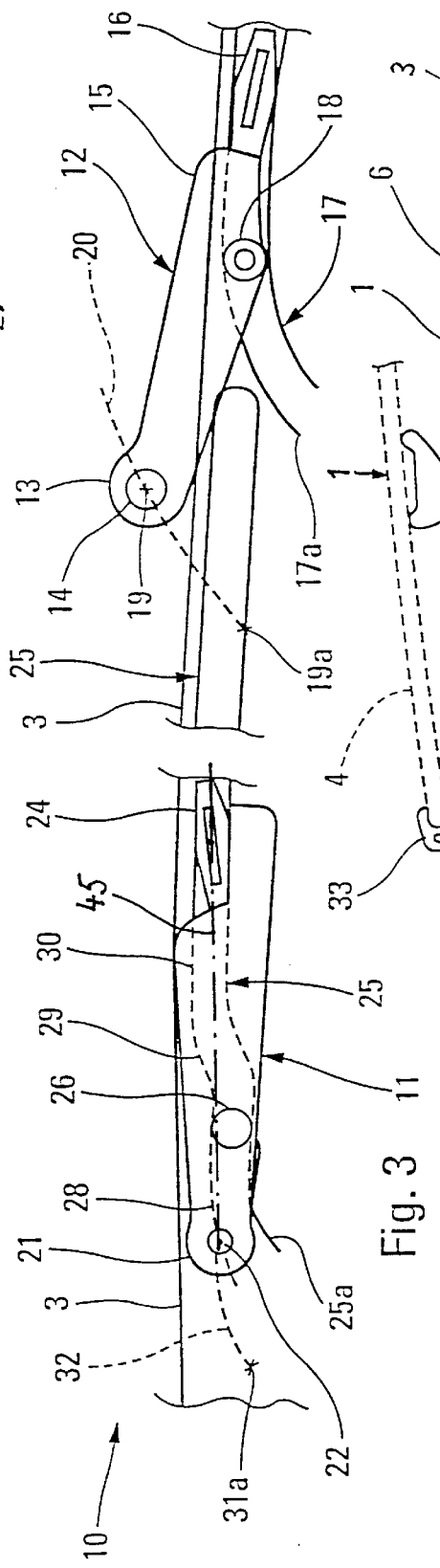
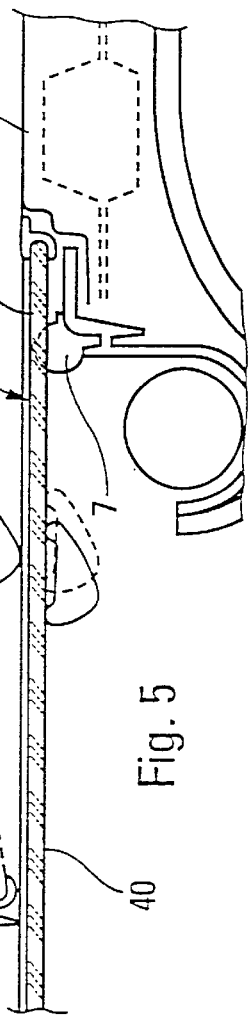
Fig. 2
Fig. 3
Fig. 5

SUN ROOF COVER FOR A ROOF OPENING IN A MOTOR VEHICLE ROOF

BACKGROUND OF THE INVENTION

1. Field of the Invention

The invention relates to a sliding roof cover for the roof opening of a motor vehicle roof which is supported to be able to move and be raised on guide rails which run lengthwise on either side of the roof opening, the bearing means of the cover on each guide rail having a front and a rear swiveling means for lifting or lowering the cover on its front edge or its rear edge when opening or closing the cover, and the two swiveling means being coupled to one another.

2. Description of the Related Art

FR-A-2 679 174 (corresponds to U.S. Pat. No. 5,276,461) discloses one such sliding roof cover with a bearing means which has on each side of the roof opening a front swiveling arm and a rear swiveling arm which are each connected to the cover by a first swiveling means which is pointed towards the vehicle interior and which are connected to the guide means by a second swiveling means which is pointed towards the outside of the vehicle in order to guide the cover forward or backward, the first and the second swiveling means being made such that displacement of the second swiveling means over a short distance out of the position in which the swiveling means is located with the cover closed results in the rear swiveling arm being swiveled and raising the rear section of the cover and thus moving the cover into its partially-opened position.

In the bearing means of FR-A-2 679 174, both the front and the rear swiveling arm are connected via three cams, which are each displaced in an appropriate guide groove a guide rail which is permanently attached on the movable cover. The grooves are made such that the swiveling motion of the front swiveling arms take place independently of the swiveling motion of the rear swiveling arms, in order to raise the rear section of the guide rails and thus the rear section of the cover before the forward section of the cover so that the cover travels into its partially-opened position. The bearing means of this cover thus contains individual components of relatively complex structure.

SUMMARY OF THE INVENTION

The object of the invention is to devise a generic sliding roof cover with a bearing means which has a simple structure, which operates reliably, and which can be easily installed on the motor vehicle roof.

The object is achieved in a generic sliding roof cover of the invention by providing front and rear swiveling means where each swiveling means has a swiveling arm coupled to the cover. Each swiveling arm in turn is provided with two guide elements which are spaced apart from one another and which are movably supported on a guideway which is located on the roof-mounted guide rail and are guided in a deflection section of the guideway such that they swivel each swiveling arm for lifting or lowering the either front or rear cover section.

This sliding roof cover has a simple and very reliable structure since each swiveling arm has two guide elements which fit into the same guideway and it is connected to the cover by a single journal. One such bearing means can be used with both a motorized cover and also a cover which is actuated by hand with a handle.

Preferably, the rear guideway is constructed and the second guide element is located on the rear swiveling arm such that a slight displacement of the first guide element in the direction to the rear causes swiveling of the rear swiveling arm, by which the rear cover section is raised and the cover is moved into its partially opened position. The course of the guideway thus determines the swiveling behavior of the swiveling arm. Feasibly, the rear guideway for the rear swiveling arm has a forward deflection section which is curved, for example concavely, and rises preferably in the manner of a parabola. However, other curvatures of the guideway of the deflection section can be provided to establish a special dynamic behavior.

When the radius of curvature of the concavely curved forward deflection section of the rear guideway increases toward the rear, the initial displacement of the rear swiveling arm causes the rear swiveling arm to first clearly be swiveled or raised. As the rear swiveling arm continues to move, the swiveling motion decreases continuously until the swiveling arm has assumed a uniform swiveled setting.

In a particular space-saving and simple configuration, the front guide element is guided in the deflection section of the rear guideway when the rear swiveling arm swivels,.

A particularly preferred embodiment of the sliding roof cover is illustrated in which each swiveling arm on its forward end has a journal which projects toward the vehicle interior and which can be swiveled relative to the cover, and on its back end has a rear guide element which projects towards the outside of the motor vehicle and which fits into a guideway attached to the motor vehicle roof, and a second forward guide element which projects toward the outside of the vehicle and which is located between the journal and the rear guide element and fits into the same guideway as the rear guide element.

When the forward guide element of the rear swiveling arm is located closer to the rear guide element than the coupling element, e.g., a journal for the cover, motion in the deflection section achieves multiplication of the raising motion.

For an arrangement which saves installation space, it is possible for the front guide element to be located underneath a line which connects the journal to the rear guide element. This can result in the rear swiveling arm being essentially horizontal when the cover is in its closed position.

In another preferred embodiment, the front guideway when viewed from its front end, has a deflection section with a first section which is curved roughly concavely and thereafter has a second section which is preferably curved roughly convexly so that the front edge of the cover executes a corresponding motion which first raises it and then lowers it again.

When the second guide element of the front swiveling arm is located closer to the journal than the first guide element and particularly when near the line which connects the journal to the first guide element, the swiveling motion of the swiveling arm follows the path of the guideway in the deflection section with virtually no multiplication of the motion.

In still another embodiment, the sliding roof cover has a drive means connected to the cover. Since the cover is driven directly, the requirement of a comparatively complex linkage of the drive means to one of the swiveling means is obviated.

Other details and advantages of the invention result from the following description of one embodiment with reference to the drawings.

BRIEF DESCRIPTION OF THE DRAWINGS

FIG. 1 shows in a vertical lengthwise section two partial views of a motor vehicle roof with a sliding roof cover, the cover being shown in solid lines in its closed position and in broken lines in its partially-opened position;

FIG. 2 shows, in a view similar to FIG. 1, a forward swiveling arm and a rear swiveling arm located on the front and rear guideways of a lateral guide rail;

FIG. 3 shows, in a view comparable to FIG. 2, the front swiveling arm and a rear swiveling arm in the position after slight displacement to the rear along the guideways;

FIG. 4 shows, in a schematic view in four successive positions, the front part of the cover which passes out of its closed position into its partially opened position and further into its open position;

FIG. 5 shows, in a partial view comparable to FIG. 1, the rear section of the cover in solid lines in its closed position and in broken lines its open position.

DETAILED DESCRIPTION OF THE INVENTION

Figure 6:
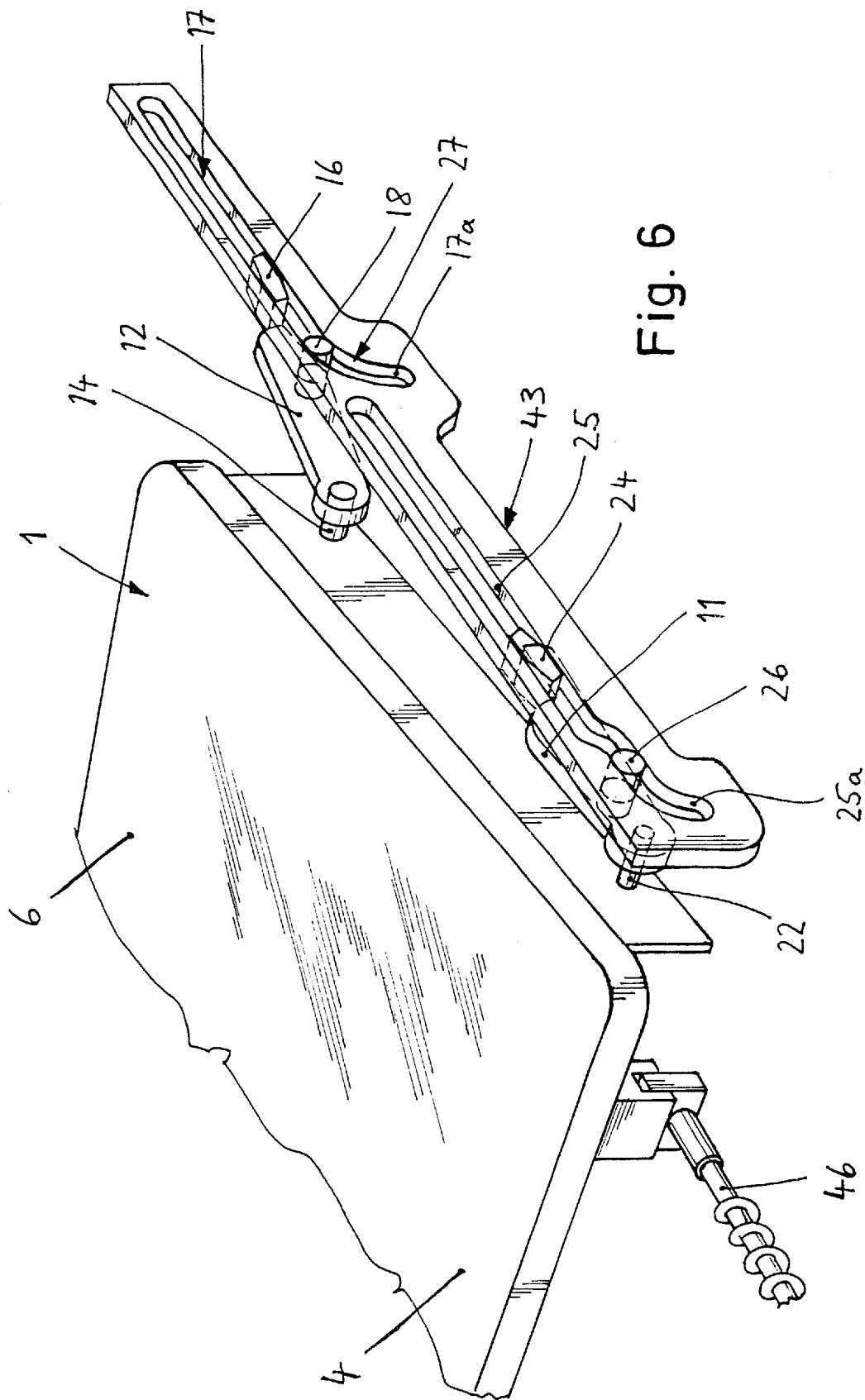
FIG. 6 shows schematically in a perspective plan view a partial view of the cover with a guide rail.

A movable cover 1 of a sliding roof on a motor vehicle, which is capable of being opened, is shown in its closed position with solid lines (see FIG. 1) such that the movable cover closes a roof opening 2 which is formed in the motor vehicle roof 3. In the closed position, the front cover section 4 compresses a front seal 5 and a rear cover section 6 compresses a rear seal 7 which are for example formed as tube seals. The front and rear seals 5 and 7 are shown in their uncompressed state. On the side edges of the roof opening 2 are lateral seals which are not shown.

The cover 1 can be pushed in the lengthwise direction 8 of the motor vehicle from the front to the back towards the rear part of the motor vehicle roof and upon doing so passes out of the position shown by solid lines in FIG. 1 into the position shown in the same FIG. 1 by broken lines. In that rearward position, the rear cover section 6 is raised over the roof 3, while the front cover section 4 adjoins the front seal 5 in order to prevent flow of the wind into the vehicle interior at high driving speed and thus prevents the resulting noise.

When the cover 1 is pushed further to the rear in direction 8, the front cover section 4 is raised over the front seal 5 and the entire cover 1 is moved to the rear into its open position shown schematically in FIG. 5, in which the cover 1 is located above the motor vehicle roof 3.

In the opposite lengthwise direction 9 of the motor vehicle (from the back to the front on the motor vehicle roof 3), the cover 1 moves successively out of its open position back into the partially opened position and finally into its closed position as shown in FIG. 1.

In the embodiment shown in FIGS. 1 to 5, the cover 1 on each side of the motor vehicle roof 3 has a bearing means 10 with a front swiveling arm 11 and a rear swiveling arm 12 each of which are connected to the cover 1 by a first guide arrangement which is pointed toward the vehicle interior and by a second guide arrangement which is pointed toward the outside of the motor vehicle. Each swiveling arm is guided to the front in direction 9 or to the rear in direction 8 to move the cover 1. Since there are bearing and guide means which are each identical on the right and the left side of the cover 1, only one of these bearing and guide means are shown and described.

The first and second guide arrangement are arranged and guided such that displacement of the second guide arrangement a short distance to the rear in the direction 8 from a closed position of the cover 1 results in the rear swiveling arm 12 being swiveled up and in this way raises the rear cover section 6 and moves the cover 1 into its partially open position.

The rear swiveling arm 12 can be swiveled in the vertical lengthwise plane of the motor vehicle roof 3, and on its front end 13 has a journal 14 which forms the first guide arrangement which projects transversely in the direction toward the vehicle interior and is pivotally mounted on the cover 1. The rear swiveling arm 12 has on its back end 15 a second guide arrangement which contains a first guide element 16 which projects transversely in the direction to the outside of the motor vehicle and fits into a rear guideway 17 of the guide rail 43 which is located on the motor vehicle roof 3 (see FIG. 6). A second guide element 18 of the second guide arrangement, which similarly projects transversely in the direction to the outside of the motor vehicle, is located between the journal 14 and the first guide element 16 and fits into the same rear guideway 17 of the guide rail 43 and the first guide element 16. The guide elements 16 and 18 are formed for example as guide fingers, but can also be sliding or rolling elements or the like.

The rear guideway 17 is formed with an initial deflection section 27 and the second guide element 18 is attached to the rear swiveling arm 12 such that a slight displacement of the first guide element 16 in the backwards direction 8 leads to swiveling of the rear swiveling arm 12 so that the rear cover section 6 is raised and the cover 1 is moved into its partially opened position.

As is shown in FIGS. 2 and 3, the rear guideway 17, proceeding from its forward end 17a, has a curved deflection section 27 which has a curvature which rises, as an example, essentially parabolically. The curved deflection section 27, preferably having a radius of curvature which becomes larger with increasing movement in the backwards direction 8, becomes a nearly linear section toward the end of the guideway 17 (see FIGS. 2 and 6).

In the embodiment shown, the second guide element 18 is located on the rear swiveling arm 12 closer to the first guide element 16 than the journal 14 (see FIGS. 2 and 3) so that relative movement of the journal 14 and the second guide element 18 relative to the first guide element 16 is increased in a ratio which corresponds to the ratio of the respective lengths of the swivel arms. Furthermore, the second guide element 18 is located underneath a straight line 44 which connects the journal 14 to the first guide element 16. With this structure, the result is that the rear swiveling arm 12 lies essentially horizontal when the cover 1 has assumed its closed position shown in FIG. 2. In this embodiment, the installation height of the entire bearing means 10 is minimized. The slight displacement of the first guide element 16 in the direction 8 to the rear leads to displacement of the axis 19 of the journal 14 out of its initial position 19a along the line 20, indicated by the broken line in FIG. 3, so that the rear cover section 6 is raised.

The front swiveling arm 11 is in the same lengthwise vertical plane of the motor vehicle roof 3 and on its front end 21 bears a journal 22 which forms the first guide arrangement projecting transversely toward the vehicle interior and is pivotally mounted on the cover 1. The front swiveling arm 11 furthermore bears on its back end 23 a second guide arrangement having a first guide element 24 which, like the rear swiveling arm 12, projects transversely in the direction toward the outside of the motor vehicle and fits into an assigned front guideway 25 of the guide rail 43 which is attached to the motor vehicle roof 3. The second guide arrangement of the front swiveling arm 11 moreover bears a second guide element 26 which projects transversely in the direction toward the outside of the motor vehicle, and is located between the journal 22 and the first guide element 24 and is movably held in the same front guideway 25 as the first guide element 24. The guide elements 24 and 26 can for example be made as guide fingers.

The front guideway 25, proceeding from its front end 25a, contains a deflection section having a first section 28 which is roughly concavely curved, followed by a second section 29 which is preferably roughly convexly curved, followed by a third section 30 which is roughly concavely curved, and then passes into a guide section which runs essentially parallel to the motor vehicle roof 3.

The second guide element 26 on the front swiveling arm 11 is located closer to the journal 22 than the first guide element 24 and preferably close to the line 44 which extends from the journal 22 to the first guide element 24 (see FIGS. 2 and 3). As a result, each front swiveling arm 11 is essentially horizontal when the cover 1 is in the closed position. FIG. 3 shows how the axis 31 of the journal 22, proceeding from its initial position 31a, moves along a path 32 which is based on the described path of the front guideway 25.

With the configurations of the swiveling arms 11 and 12 described above, the front seal 33 which is attached to the front cover section 4 in FIG. 4 is shown schematically in four successive different positions 33A, 33B, 33C, and 33D, which are assigned to the four successive positions of the cover 1 moving from its closed position in the backwards direction 8.

In the closed position of the cover 1, the seal 33 assumes a position 33A in which the seal 33 is pressed against the edge 34 of the roof opening 2. The cover 1 lies in its lower position according to the first section 36 of the curve 35 such that the front seal 5 is compressed.

In the first intermediate position 33B, the cover 1 with the seal 33 is moved back to the rear in the direction 8 and is raised up; this corresponds to the second section 37 of the curve 35 in which the compression of the seal 5 is reduced.

In the position 33C, which corresponds to the partially open position of the cover 1, the seal 33 has moved further to the rear in the direction 8, but is lowered and exerts increased compressive pressure on the front seal 5, as is schematically indicated by the section 38 of the curve 35.

In the partially open position of the cover 1, the front cover section 4 is pressed securely against the front seal 5 such that sealing occurs against the flow of air caused by the driving speed of the vehicle. The front cover section 4 moreover reaches a sufficiently lowered position such that the occurrence of disturbing wind noise for the passengers is prevented.

Finally, in position 33D, the seal 33 and the front cover section 4 are clearly raised above the seal 5 and the roof 3 in order to at least partially clear the roof opening 2; this corresponds to the rear ascending section 39 of the curve 35. During the backwards motion described above, the bottom 40 of the cover 1 assumes a succession of assigned positions 40A, 40B, 40C, and 40D.

FIG. 4 clearly shows that the position 40B of the cover 1 is relatively higher than the position of the cover 1 when in partially open position 40C, thereby enabling displacement of the cover 1 in the direction 8 to the rear. During this movement of the cover, the front seal 5 is less strongly compressed which facilitates displacement of the cover 1 and prevents damage to the seal 5.

The front seal 5 is located a sufficient distance from the front edge 34 of the roof opening 2 so that when seal 33 is in the position 33C, which corresponds to the partially open position of the cover 1, the bottom 40 of the cover in its position 40C which still adequately compresses the front seal 5 to achieve the aforementioned sealing against wind noise.

In the embodiment shown in the figures, the first guide element 16 of the rear swiveling arm 12 and the first guide element 24 of the front swiveling arm 11, when viewed in a lengthwise cross-section, have the shape of a rhombus which provides improved flat guidance of the swiveling arms 11 and 12 in the guideways 17 and 25. This rhombus shape is easily formed as a cap 41 which is situated on and encompasses the end of core 42 of the first guide elements 16 and 24.

If the cover 1 is actuated using a handle (not shown) and the handle is pushed to the rear, the slight displacement motion of the cover 1 is transferred immediately to the rear swiveling arm 12, by the journal 14, which is swiveled upward by the walls of the rear guideway 17 as a result of the guidance of the first guide element 16 and the second guide element 18.

The cover 1 can be moved by means of a motorized drive (not shown) which drives the rear swiveling arm 12 and/or the front swiveling arm 11 by means of driving carriages (not shown) which are pivotally connected near the axes of the first guide elements 16, 24 to the swiveling arms 11, 12.

Preferably, however, the drive cable 46 of a drive means for moving the cover 1 is connected to the cover (see FIG. 6). Thus, the bearing means of the cover 1 mounted on the respective guide rail 43 contains only the front and rear swiveling arms 11 and 12. Other components are not necessary, so that an especially simple structure is made possible. in the embodiment in which a drive cable is attached to a driving carriage which is supported on the lateral guide rail 43, water can collect in the guide rail or in a gutter, which is located outside the edge-side seal of the roof opening, and can seep along the drive cable to the drive motor. However, the configuration shown in FIG. 6, in which the guide rail 43 is separate from the drive means, has a simpler structure and contains essentially only the two guideways 17 and 25 thereby avoiding the problem of water seepage. The guide rail 43 illustrated is constructed with sunken guideways 17 and 25 and is composed of, for example, steel or aluminum.

Due to the differently configured deflection sections of the guideways 17, 25, different motion sequences of the front edge and of the rear edge of the cover 1 can be set. Thus, for example, the front guideway 25 can have a front, initially downwardly leading deflection section such that the front cover section 4 is lowered into the ventilation position before is moved horizontally or somewhat ascendingly to the rear.

What is claimed is:

1. Sliding roof cover for the roof opening of a motor vehicle roof capable of being moved along and raised on guide rails which run lengthwise on each side of the roof opening comprising, a bearing means on each side of the roof opening which cooperates with a respective one of the guide rails and includes a front and a rear swiveling means for raising a front edge and a rear edge of the cover when opening the cover from a closed position, and for lowering the front edge and the rear edge of the cover when lowering the cover back to said closed position after opening thereof, wherein the front and rear swiveling means, at each side of the roof opening, are coupled to one another by a respective guideway which produces a synchronized movement of the front and rear swiveling means, and each swiveling means includes a swiveling arm coupled to the cover wherein each swiveling arm includes first and second guide elements which are spaced apart from one another and which are movably supported on said respective guideway and are guided along a deflection section of the respective guideway such that the swiveling arms are swiveled for raising or lowering the front edge and rear edge of the cover.

2. Sliding roof cover as set forth in claim 1, wherein a rear guideway is provided on each of the guide rails to cooperate with the second guide element located on the respective swiveling arm located at the rear of the cover in order that a small displacement of the first guide element in the direction toward the rear results in raising the second guide element and swiveling of the rear swiveling arm by which the rear edge of the cover is raised and the cover is moved into a partially opened position.

3. Sliding roof cover as set forth in claim 2, wherein the rear guideway for the rear swiveling arm has a forward deflection section comprising a downward facing concave curve which rises in the shape of a parabola.

4. Sliding roof cover as set forth in claim 3, wherein the radius of curvature of the concave curve of the forward deflection section increases toward the rear.

5. Sliding roof cover as set forth in claim 1, wherein the second guide element is guided in a deflection section of the rear guideway when a rear swiveling arm swivels.

6. Sliding roof cover as set forth in claim 1, wherein each swiveling arm includes a journal on the front end of the swiveling arm which projects toward the vehicle interior and is connected to the cover wherein the journal can be swiveled relative to the cover, the first guide element located on the rear end of the swiveling arm which projects towards the outside of the motor vehicle and fits into the guideway on the guide rail, and the second guide element located between the journal and the first guide element of the swiveling arm which projects toward the outside of the vehicle and fits into the same guideway as the first guide element.

7. Sliding roof cover as set forth in claim 6, wherein the second guide element is located closer to the rear guide element than the journal.

8. Sliding roof cover as set forth in claim 7, wherein the second guide element is located underneath a straight line which extends through the journal and first guide element.

9. Sliding roof cover as set forth in claim 7, wherein the rear swiveling arm is positioned in substantially a horizontal position when the cover is in a closed position.

10. Sliding roof cover as set forth in claim 1, wherein a front guideway is provided on each of the guide rails such that when proceeding to the rear, the front guideway has a deflection section comprising initially a downward facing concave curved section and subsequently a downward facing convex curved section.

11. Sliding roof cover as set forth in claim 6, wherein the second guide element of each front swiveling arm is positioned approximate a straight line which extends through the journal and first guide element.

12. Sliding roof cover as set forth in claim 11, wherein each front swiveling arm is positioned in substantially a horizontal position when the cover is in a closed position.

13. Sliding roof cover as set forth in claim 1, wherein each first guide element has a cross section in the shape of a rhombus.

14. Sliding roof cover as set forth in claim 1, wherein a drive means is connected to the cover.

* * * * *